US006832323B1

(12) United States Patent
Booth et al.

(10) Patent No.: US 6,832,323 B1
(45) Date of Patent: Dec. 14, 2004

(54) OBJECT AND FEATURE AUTHORIZATION FOR DIGITAL COMMUNICATION TERMINALS

(75) Inventors: Robert Charles Booth, Jamison, PA (US); Donald Tavoletti, Warrington, PA (US); Michael Difiglia, Jenkintown, PA (US)

(73) Assignee: General Instrument Corporation, Horsham, PA (US)

( * ) Notice: Subject to any disclaimer, the term of this patent is extended or adjusted under 35 U.S.C. 154(b) by 361 days.

(21) Appl. No.: 09/679,994

(22) Filed: Oct. 5, 2000

Related U.S. Application Data

(60) Provisional application No. 60/161,228, filed on Oct. 22, 1999.

(30) Foreign Application Priority Data

Oct. 22, 1999 (WO) .............................. PCT/US99/24745

(51) Int. Cl.⁷ .............................................. G06F 11/30
(52) U.S. Cl. ...................... 713/201; 713/200; 709/225; 707/9
(58) Field of Search ................................ 713/200, 152, 713/161, 170, 166, 164, 155, 201, 202; 707/104.1, 9, 3, 10; 709/224, 223, 225

(56) References Cited

U.S. PATENT DOCUMENTS

| 5,654,746 | A | | 8/1997 | McMullan, Jr. et al. ...... 725/29 |
| 5,734,589 | A | | 3/1998 | Kostreski ...................... 345/716 |
| 5,951,639 | A | * | 9/1999 | MacInnis ....................... 725/70 |
| 6,049,785 | A | * | 4/2000 | Gifford .......................... 705/39 |
| 6,115,821 | A | * | 9/2000 | Newby et al. ............... 713/200 |
| 6,134,591 | A | * | 10/2000 | Nickles ........................ 709/229 |
| 6,256,393 | B1 | * | 7/2001 | Safadi et al. ................ 380/232 |
| 6,373,950 | B1 | * | 4/2002 | Rowney ....................... 380/255 |
| 6,460,023 | B1 | * | 10/2002 | Bean et al. .................... 705/54 |

FOREIGN PATENT DOCUMENTS

| EP | 0 399 200 A2 | 11/1990 |
| EP | 0 399 200 | 11/1990 |
| EP | 0 752 786 | 1/1997 |
| EP | 0 905 984 | 3/1999 |

OTHER PUBLICATIONS

Balabanian, V. et al., "An Introduction to Digital Storage Media—Command and Control," *IEEE Communications Magazine*, Nov. 1996, pp. 122–127.

* cited by examiner

*Primary Examiner*—Greta Robinson
*Assistant Examiner*—Cheryl Lewis
(74) *Attorney, Agent, or Firm*—Barry R. Lipsitz; Douglas M. McAllister

(57) ABSTRACT

A system for security and authorization processing in digital terminals. The processing load of a security processor (250) at the terminal (150) is reduced by configuring a multiple applications manager (MAM) (240) to determine if frequently-transmitted application data should be downloaded. The security processor is used by the MAM to build a local virtual application table (260) that indicates which applications are authorized for downloading. The security processor configures the terminal with an authorization state so that it knows which applications it is authorized to download, i.e., the applications (316', 334', 376') whose required authorization state correlate with the terminal's configured authorization state. The security processor is accessed when the terminals authorization state changes, or when a required authorization state of an application changes. These events are typically relatively infrequent.

16 Claims, 6 Drawing Sheets

OBJECT AND FEATURE AUTHORIZATION FOR DIGITAL COMMUNICATION TERMINALS

This application claims the benefit of U.S. Provisional Application No. 60/161,228, filed Oct. 22, 1999, and PCT Application No. PCT/US99/24745, entitled "Method And Apparatus For Managing Multiple Applications In Large Scale Networks", filed Oct. 22, 1999.

BACKGROUND OF THE INVENTION

The present invention relates to digital communications, and more particularly to the use of a digital message (such as a Virtual Object message encapsulated within an MPEG message), transmitted across any network (such as delivered via a broadband cable network), to deliver information to a digital consumer terminal. The mechanisms, messages and data structures, which allow a digital network to manage and utilize the authorization and security features for multiple applications in consumer terminals are described.

Various software applications, such as an electronic program guide (EPG), e-mail, web browser, shop or bank at home, stock ticker, and the like, can be written for digital terminals. These applications enhance the user's experience and increase the revenue for service providers and for equipment manufacturers.

However, the processing of authorizing the terminals to acquire and enable the code objects for these applications places a burden on the limited resources of the security processor in the terminal. The applications are typically downloaded from a download server in the digital network and acquired by a downloader module in the digital terminal. The download server encapsulates small chunks of the application's object code into download messages, known as Tune Download Channel Message, e.g., which are MPEG2-compliant. The messages are inserted into the downstream path of the digital network for acquisition by the terminals. However, these message are transmitted relatively frequently, e.g., in a carouselled manner.

Conventionally, each time the application data is received at the terminal, the security processor is required to determine whether the terminal is authorized to process the Tune Download Channel Message. If the terminal is authorized to process the message, the downloader module in the terminal tunes to a specified channel (PID stream) for the download messages containing the application object code. The download messages containing the object code for an application are normally transmitted in sequence, with sequence numbers, continuously and repeatedly (e.g., in a process known as carouselling) so that they are available in the download stream whenever a terminal finds a need to acquire them. Moreover, the object code for typical applications may be large, needing a large number of download messages to transmit the complete application. Hence, in order to minimize the acquisition time of an application by a terminal, it is advisable that the terminal can start acquiring download messages at any point in the transmission sequence of the object code.

As a result, the Tune Download Channel Messages (containing tier match decoder conditions) for an application are transmitted downstream frequently, which results in a significant authorization processing burden on the security processor.

Moreover, newer versions of terminal firmware will support a Multiple Applications Management (MAM) environment, such as described in co-pending, commonly-assigned PCT Application No. PCT/US99/24745, entitled "Method And Apparatus For Managing Multiple Applications In Large Scale Networks", filed Oct. 22, 1999.

A MAM environment allows multiple virtual applications to be downloaded into a terminal. Under MAM, the number of applications available to a terminal is expected to grow considerably, beyond the single traditional EPG application. As a result, it is expected and observed in tests, that the security processor will be burdened beyond its capacity for keeping up with authorization processing for the download of multiple applications. Moreover, the security processor will be impaired from performing other tasks, such as decrypting encrypted programming services, e.g., for pay-per-view, near-video-on-demand and other premium services.

Accordingly, it would be advantageous to provide a system that application data to be securely delivered to a terminal, yet reduces processing requirements of a security processor at the terminal.

Such a system should be much less expensive than currently available solutions in terms of security chip processing.

The present invention provides a system having the above and other advantages.

SUMMARY OF THE INVENTION

The present invention relates to security and authorization processing in digital terminals. The invention is particularly suitable for use when such terminals are operating in a Multiple Applications Management (MAM) environment in a digital network, but can be adapted for other uses as well that have a need to control the downloading and authorizing of applications at a terminal.

The invention reduces the overhead and expense of security chip processing in terminals for the processing of Tune Download Channel Messages (TDCMs) associated with large numbers of applications at the terminal. These TDCMs are transmitted very frequently by a controller in the digital network, and inform the terminals about which channel to tune to for acquiring the object code, and provide data for applications which can be enabled and executed on the terminals.

In particular, TDCMs may contain decoder conditionals in the message preamble portion of the MPEG message. A determination as to whether or not the terminal will continue to process the remainder of the message is based upon the success or failure of the decoder conditional terms. One such decoder conditional is a tier match condition, which is specified in the TDCM preamble.

An MPEG packet processor module within a terminal receives the MPEG messages. When the MPEG packet processor receives a TDCM containing a tier match decoder condition, the message is passed to a user processor. The user processor asks a message preamble handler to check if the terminal is authorized for processing the message. The message preamble handler interrogates the security processor module within the terminal, an example of which is the TSODA processor used in terminals manufactured by Motorola Corporation.

The security processor checks the tier match conditions specified for the TDCM against the authorization rights independently obtained by the -terminal via Entitlement Management Messages (EMMs). A sequence of non-trivial processing is needed in the security processor to check the tier match authorization.

The invention bypasses the use of tier match decoder condition message preambles with TDCMs, thereby reducing the need for security chip processing. In particular, newly created messages processed by the MAM module in the terminals provide the authorization requirements of the applications. The MAM maintains the authorization states of applications in non-volatile memory.

In particular, when a TDCM is received by the downloader module in the terminal, the MAM informs the downloader about the authorization state of the application directly from the MAM's internal table. Thus, the security processor is not queried to see if an application in a download message is authorized for download. The security processor only need be queried when authorization rights of the terminal change, or when new application data or authorization requirements are received.

This avoids unnecessary repeat queries of the security processor, which would otherwise occur due to the repeated broadcast (carouselling) of the applications.

Moreover, backward compatibility is preserved for terminals which are not running MAM capable firmware (platform code).

A particular method for processing data in a digital user terminal includes the steps of providing data to the terminal that includes at least terminal authorization rights, configuration data, and download messages. The download messages include application data for applications that are executable on the terminal. The applications have associated required authorization requirements. The terminal authorization rights are processed at a security processor at the terminal to configure an authorization state of the terminal. Additionally, the configuration data is processed at a multiple applications manager (MAM) at the terminal to configure the terminal to receive the application data. The MAM queries the security processor to establish a database of the applications whose required authorization states correlate with the terminal's authorization state. Additionally, the download messages are processed to determine whether to download or discard the application data received at the terminal in accordance with the database.

A corresponding apparatus is also presented.

DETAILED DESCRIPTION OF THE INVENTION

The present invention relates to security and authorization processing in digital terminals and, more particularly, to the use of a digital message (such as a Virtual Object message encapsulated within an MPEG message), transmitted across any network (such as delivered via a broadband cable network), to deliver information to a digital consumer terminal.

The following terms and acronyms are used:
EMM—Entitlement Management Message
MAM—Multiple Applications Management/Manager
PID—Packet Identifier
TDCM—Tune Download Control Message
VAT—Virtual Application Table
HTTP—Hyper Text Transport Protocol
TDCM—Tune Download Control Message
VOM—Virtual Object Message For example, the following types of information can be provided in accordance with the invention:

A. Software application specific information (such as the VAT), including, but not limited to:
  i) Application authorization requirements used to authorize the download of an application to a terminal,
  ii) Application authorization requirements used to authorize the execution of (or enabling of) an application in a terminal,
  iii) Application feature authorization requirements used to authorize such features on a terminal (e.g., built-in e-mail, video-on-demand, or web browsing capabilities associated with an application such as an electronic program guide).
B. Initialization and configuration information allowing for:
  i) A digital consumer terminal to receive the software specific information listed above.

In a MAM environment, such as described in PCT Application No. PCT/US99/24745, digital terminals can be authorized for acquiring and enabling of multiple applications by messages created, encapsulated in MPEG format, and sent by a controller (e.g., a DAC) to the terminals. MAM is implemented by using some new, as well as some existing messages that are modified and/or interpreted differently. MAM uses the Security Processor module within the terminal to determine which of the multiple applications is authorized for acquisition and enabling by the terminal.

Figure 1:
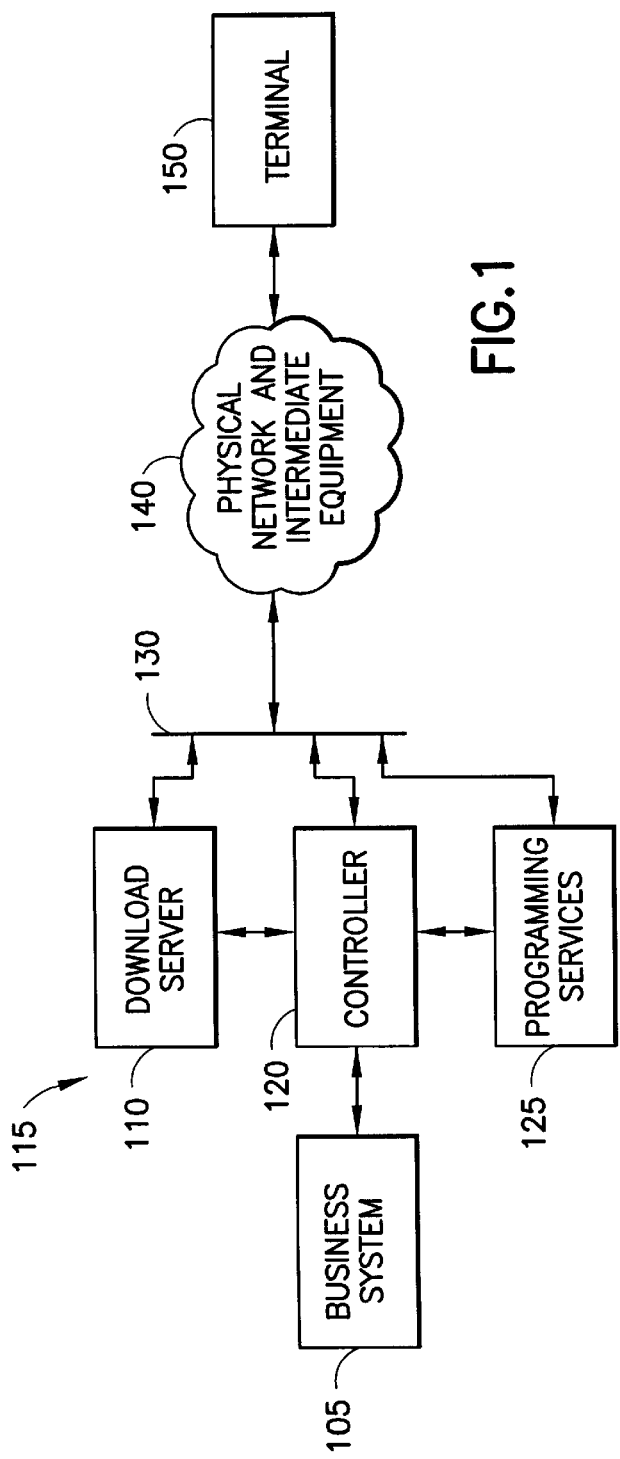
FIG. 1 illustrates an overview of a digital network for providing multiple application management in accordance with the present invention.

FIG. 1 provides an overview of a digital network capable of providing Multiple Application Management.

A business system 105, which may be located at, or otherwise be in communication with, the headend 115 of a network such as a cable or satellite television network, manages the billing and authorization of applications for each specific terminal in a network.

Users of the network can make arrangements to receive authorizations for the applications using conventional techniques, e.g., by phoning an operator and authorizing a credit card payment, or by use of an upstream communication path on the network, if available. The business system 105 can be implemented with a computer and known record-keeping and billing procedures.

The business system 105 communicates with a controller 120, which communicates with a download server 110. The download server 110 transmits the application data via an interface 130, and physical network and intermediate equipment 140 to a terminal 150, which may be in a large terminal population.

Alternatively, or in addition, control data can be provided to the terminal 150 by other means, such as locally using a smart card, or at the time of installation or manufacture of the terminal. The controller 120 thus configures and authorizes the terminals under the control of the Business System 105.

Programming services, e.g., conventional television programs, or other video, audio or other data, is provided by a programming services function 125.

The application and control data can be encapsulated in transport packets, for example, such as MPEG-2 packets, using known techniques.

The physical network and intermediate equipment 140 may include cable and/or optical fiber, as well as required switches, amplifiers and other conventional components.

Figure 2:
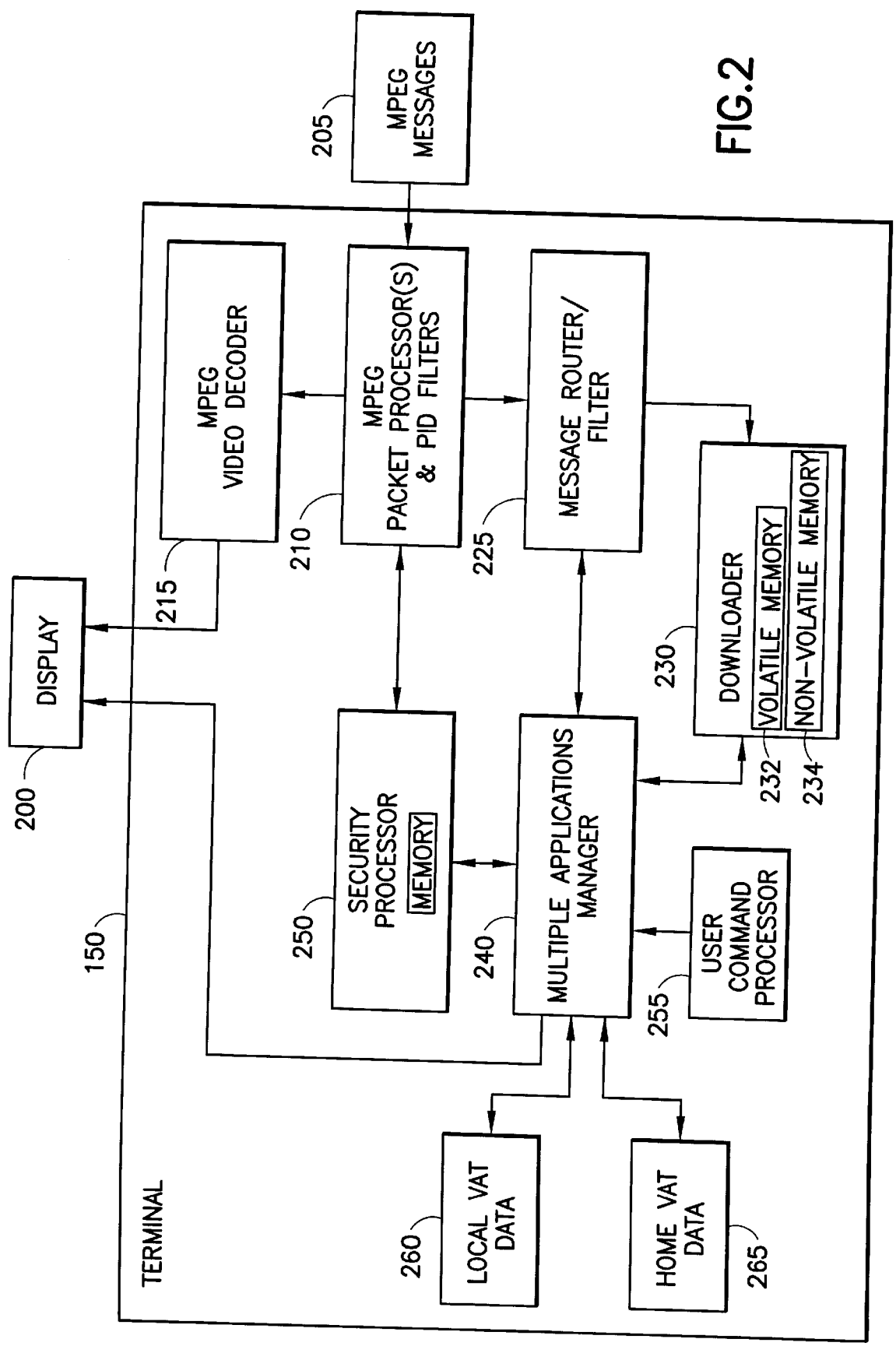
FIG. 2 illustrates a digital terminal with a multiple application management capability in accordance with the present invention.

FIG. 2 illustrates a digital terminal with multiple application management capability in accordance with the present invention. Like-numbered elements correspond to one another in the figures. The terminal 150 receives MPEG messages (packets), such as an example packet 205, from a communication channel. Use of MPEG packets is discussed herein only as an example. Any digital data transport protocol may be used.

An MPEG packet processor and packet identifier (PID) filter 210 processes the packet 205 to recover the control data from the controller 120 of FIG. 1, which is provided to a security processor 250 and a MAM 240. The MAM 240 and other terminal functions can be implemented using any known software, firmware and/or hardware techniques.

The control data, including authorization state data, can be stored at a memory associated with the terminal 150, such as in the non-volatile memory 234. A volatile memory 232 may also be provided. The packet processor 210 also recovers the application data and forwards it to a downloader 230. The downloader 230 uses the associated memory 234 for storing the downloaded application data, including the applications themselves, such as code objects. "Downloading" refers to recovering and storing. The downloader 230 also receives a TDCM that commands it to download particular applications, and/or particular versions of the same application from a specific channel. The channel may be identified by a PID in a known manner.

The packet processor 210 may also recover conventional programming services for decoding, e.g., at an MPEG video decoder 215, and display on a display 200.

The MAM 240 can output data to the display 200 for launching the applications separately or together with data from a programming service.

Figure 4:
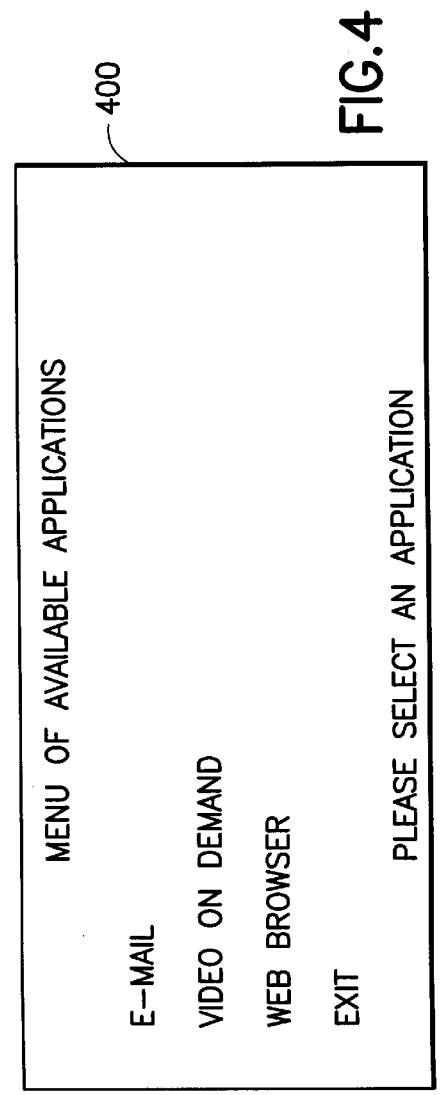
FIG. 4 illustrates an example dynamically-created menu of the available applications at a terminal in accordance with the present invention.

The MAM 240 can also output data to the display 200 for providing an on-screen menu of available applications (see FIG. 4). A user may interact with the menu via a user command processor 255, e.g., which receives input signals from a keyboard, infra-red remote control or the like.

The security processor 250, a Local VAT memory 260, a Home VAT data memory 265, and a message router/filter 225 communicate with the MAM 240. Home VAT data refers to common VAT table that is downloaded to all terminals, while local VAT data refers to data that is used by each terminal, and is derived as a subset of the home VAT data based on the terminal's authorization state. Essentially, the local VAT data designates the latest version of each application that a terminal is authorized to download and access. The local VAT data can therefore be different for different terminals.

The message filter/router 225 sends data such as control data and authorization data, including the home VAT data and EMMs to the MAM 240, while the application code (software) is sent to the downloader 230.

With the present invention, control data is used to authorize terminals to acquire multiple applications, and to enable the applications for use within the terminal.

The MAM 240 can be implemented by using new messages in the terminal 150, as well as some existing messages that are modified and/or interpreted differently.

The MAM 240 receives and processes these messages, and uses the security processor 250 to determine which of the multiple applications is authorized for acquisition and enabling at the terminal.

Virtual applications are applications that can be identified, downloaded, and enabled under the control of the MAM 240. The virtual applications can be transported to the terminal 150 in download messages. However, the applications could be downloaded via other means, such as via HTTP.

The data structures and information contained in the messages provide authorization requirements needed by a terminal for downloading an application. They also may provide authorization requirements needed by a terminal for enabling and executing an application or any special characteristics that may be associated with the application.

In addition, via other messages sent by the controller, the terminal receives authorization rights for an application or for any special characteristics associated with an application. For example, EMMs sent from the controller can authorize a terminal for an application or its characteristics. This is analogous to authorizing a terminal for a video service.

Using the authorization requirements and the authorization rights, the MAM 240 uses the security processor module 250 to determine the authorization state of any given version of an application or its special characteristics. The MAM 240 maintains the authorization state of a virtual application in internal tables in the non-volatile memory 234 so that the information is preserved across terminal resets.

The authorization state of an application determines if an application can be downloaded by the terminal. In other words, whether an application (or a specific version of the application) is acquired into, preserved in, purged from, or deleted from, the terminal's memory is dependent on the authorization state of the application.

In accordance wit the invention, the receipt of a TDCM by a terminal does not result in any processing by the security processor 250. Instead, the MAM 240 obtains the authorization state information for the virtual application from its internal tables, and informs the downloader 230 whether the application is authorized for acquisition or not. The present invention therefore minimizes the processing overhead on the security processor 250.

A MAM system is provided in which the tier match decoder condition is eliminated from the message preamble of the MPEG encapsulation of the TDCM. Consequently, security chip processing is eliminated when a terminal receives a TDCM. The TDCM informs a terminal which channel to tune to for acquiring the code object for an application.

Information about all the applications which a terminal could acquire and/or enable is provided to the terminal by using a Virtual Object Message (VOM). The VOM is part of the set of new or modified messages used for supporting the MAM feature in digital networks. This message is described in more detail in Section 1.1.3 below. The VOM is sent to, and received by, a terminal prior to the terminal receiving and processing TDCMs specific to virtual applications.

The VOM provides the VAT to the terminal. The VAT data may be stored the non-volatile memory 234, which may be a flash memory, battery-backed SRAM, or hard drive if available, or any other non-volatile memory available in the terminal. Alternatively, the VAT data may be stored in the volatile memory 232, in which case it is simply re-acquired from the network each time the terminal is powered on.

Figure 3:
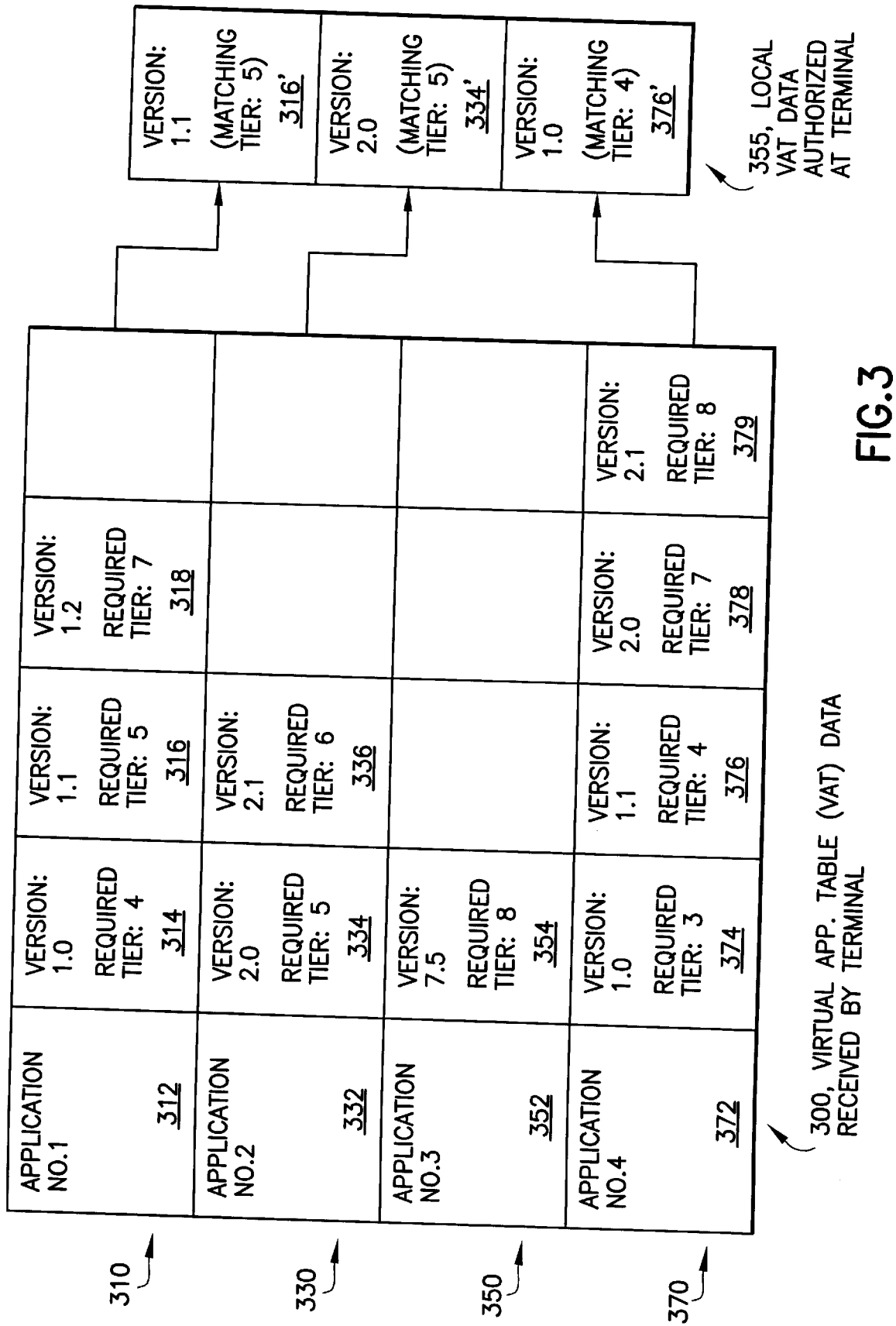
FIG. 3 illustrates the creation of a local virtual application table (VAT) for a terminal based on the terminal's authorized tiers in accordance with the present invention.

FIG. 3 illustrates the creation of a local VAT for a terminal based on the terminal's authorized tiers in accordance with the present invention.

VAT data that is received by each MAM configured terminal in the network, shown generally at 300, includes a number of rows 310, 330, 350 and 370 of records (va_ records). Records 312, 332, 352 and 372 contain the identifications (object_application_ID) of the first, second, third and fourth applications (i.e., Applications No. 1, No. 2, No. 3, and No. 4, respectively).

Records 314, 316 and 318 contain the version identifier (object_version) and required tier (virtual_application_tier) for a first application. For example, record 314 has a version "1.0" and a required tier of "4", record 316 has a version "1.1" and a required tier of "5", and record 318 has a version "1.2" and a required tier of "7".

As an example, Application No 1. might be an e-mail capability, where version 1.0 is a basic version, version 1.1 is an enhanced version, and version 1.2 is a test version. Therefore, the invention allows a network operator to control which terminals can access which version of Application No. 1. Users who pay a small fee can access version 1.0, those who pay a larger fee can access version 1.1, and others can access version 1.2, e.g., to provide feedback to the network operator as to whether the version 1.2 works properly or provides desirable features.

For Application No. 2, record 334 has a version "2.0" and a required tier of "5", and record 336 has a version "2.1" and a required tier of "6".

For Application No. 3, record 354 has a version "7.5" and a required tier of "8".

For Application No. 4, record 374 has a version "1.0" and a required tier of "3", record 376 has a version "1.1" and a required tier of "4", record 378 has a version "2.0" and a required tier of "7", and record 379 has a version "2.1" and a required tier of "8".

Versions and tiers are numeric values. The virtual_application_name is a text string that is associated with all versions of a virtual application and is displayed on the dynamically built menu if one of the versions is authorized in the terminal.

The local VAT data that is authorized at the terminal, shown at 355, is assembled from the received VAT records 300 according to the tier (virtual_application_tier) with which the particular terminal is authorized. In the present example, it is assumed that the terminal's authorized rights include tiers "4" and "5". The local VAT data 355 and its tiers denote an authorization state of the terminal.

In this case, the matching tier requirements in the VAT records 300 are in records 316, 334 and 376. Accordingly, the terminal's local VAT 355 includes these records, e.g., stored in the VAT memory 260 of FIG. 2, as records 316', 334' and 376'. Note that when a terminal is authorized to receive two or more versions of the same application (e.g., records 314 and 316), it is generally desirable to select the most recent version (e.g., record 316). Generally, the required authorization state of an application is said to correspond to, or correlate with, the authorization state-of a terminal when the terminal's security processor has received a matching tier via an EMM.

If there is no matching tier for the terminal, e.g., as with Application No. 3, the terminal is not authorized to receive that application, and it is not downloaded.

It is possible to provide a required tier and/or authorized tier that allows a terminal to receive the highest version of all available applications.

Note that the VAT data 300 shown is only an example, and various numbers of applications, versions and tiers may be present in the VAT data. Additionally, the local VAT 355 may include all, some or none of the applications in the received home_VAT 300.

FIG. 4 illustrates an example dynamically-created menu of the available applications at a terminal in accordance with the present invention. The menu 400 presents the available authorized applications to the user, e.g., on a television screen. Note that the menu items correspond to the terminal's local VAT 355.

Each application may have a user-friendly textual data (virtual_name) associated with it. The messages provided to the terminal provide this textual data that describes the application. This data can be used on the display menu 400 of the terminal.

For example, referring to the example of FIG. 3, Application Nos. 1, 2 and 4 may have the textual data "E-mail", "Video-on-Demand, and "Web Browser", respectively.

Optionally, an additional textual string denotes the version of the application, or the corresponding service tier that the user has purchased. For example, for marketing purposes the versions may be denotes by bronze, silver or gold or the like.

Using the text associated with applications, the MAM 240 of FIG. 2 can dynamically construct a menu of authorized applications.

A user of a terminal can activate this menu and launch (e.g., start) one or more of the available applications by conventional interface techniques, e.g., using a key on a remote control. A particular key may be reserved on the remote control as a "MAM menu button".

Upon receiving VAT data from the controller 120, the MAM may build a menu consisting of a list of names of the authorized applications. This can be accomplished using known software techniques, for example. The menu may also include an "Exit" item to exit the menu. The menu may be implemented as a full or partial screen overlay with the audio muted. In addition, the front panel LEDs may be cleared while the menu is displayed.

A user can activate the display of the menu by pressing the "MAM menu button" on the remote control, and use the "up" or "down" keys on the remote control or on the front panel to scroll through the menu. A user can select an application for launch by pressing the "select" button on the remote control or the front panel of the terminal.

When an application is selected from the menu, the MAM 240 may inform the downloader 230 to enable the application, and the application is started (e.g., launched). The terminal may tune to a specified channel before enabling the application.

If the user selection is not authorized, or is not present in the VAT or in the downloaded objects directory, the MAM 240 will try to re-create the menu and re-display it. After several failed attempts to launch a specific virtual application, the terminal will resort to some type of graceful recovery action.

The user can choose to not select any virtual application on the menu, as a result of which the MAM will re-enable the previously enabled (i.e.—prior to the menu being displayed) virtual application, or resort to a graceful recovery action that may enable the terminal's default virtual application.

Figure 5A:
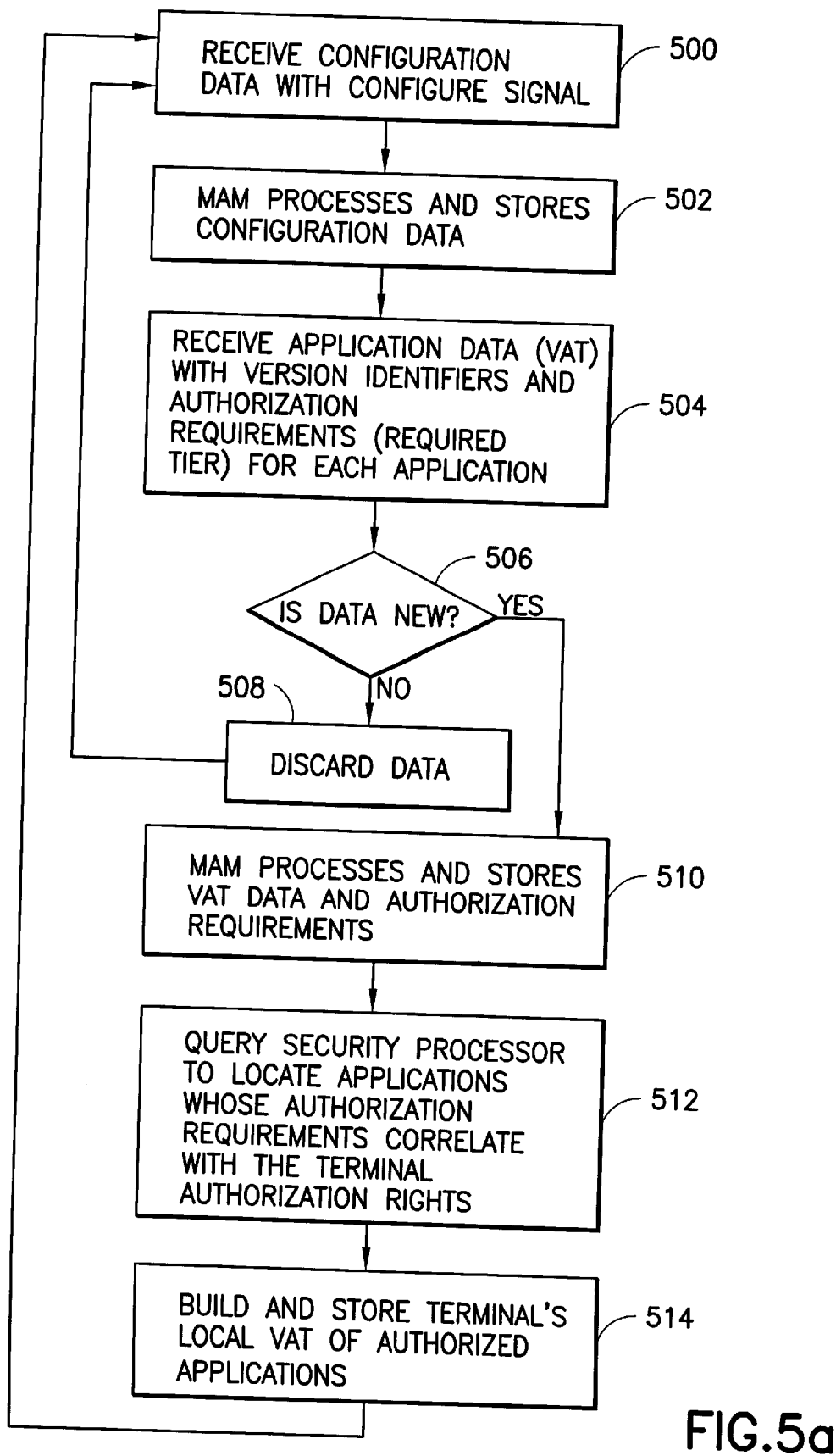
FIG. 5(a) illustrates a method for processing configuration and application data in accordance with the present invention.
Figure 5B:
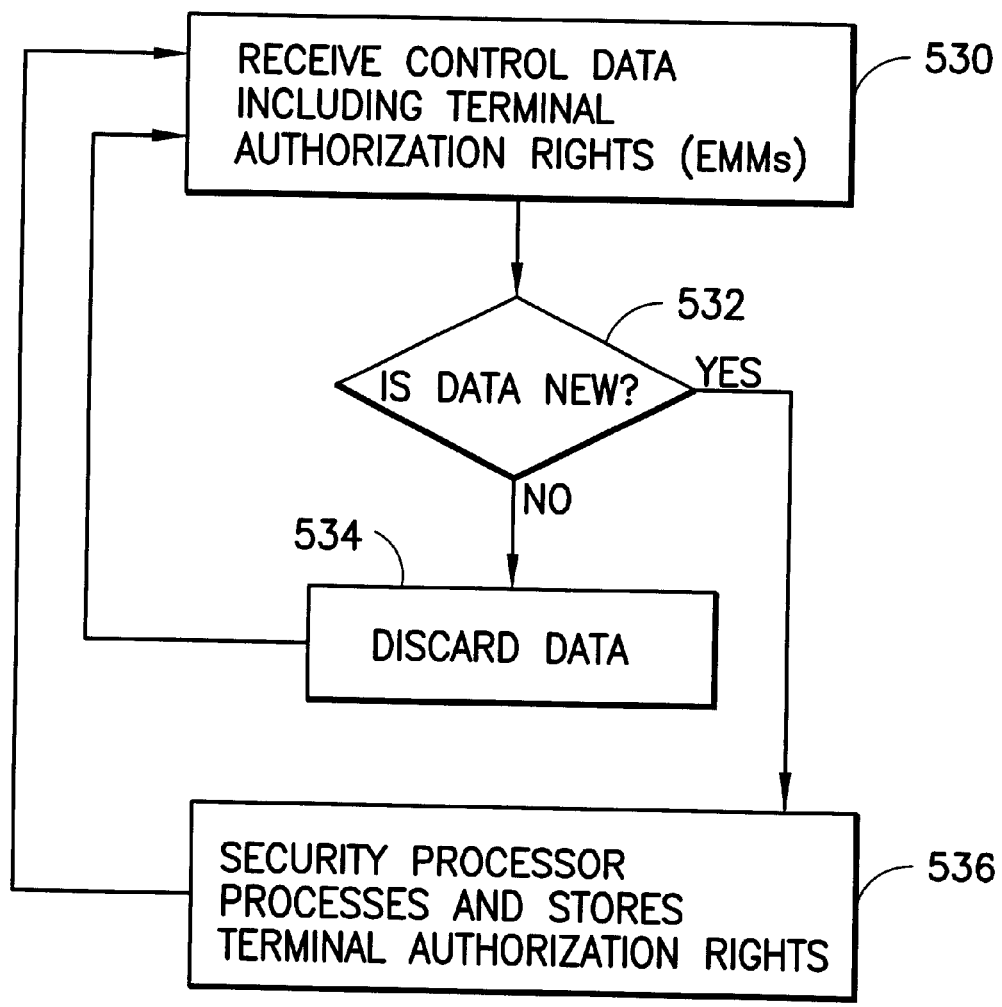
FIG. 5(b) illustrates a method for processing terminal authorization rights in accordance with the present invention.
Figure 5C:
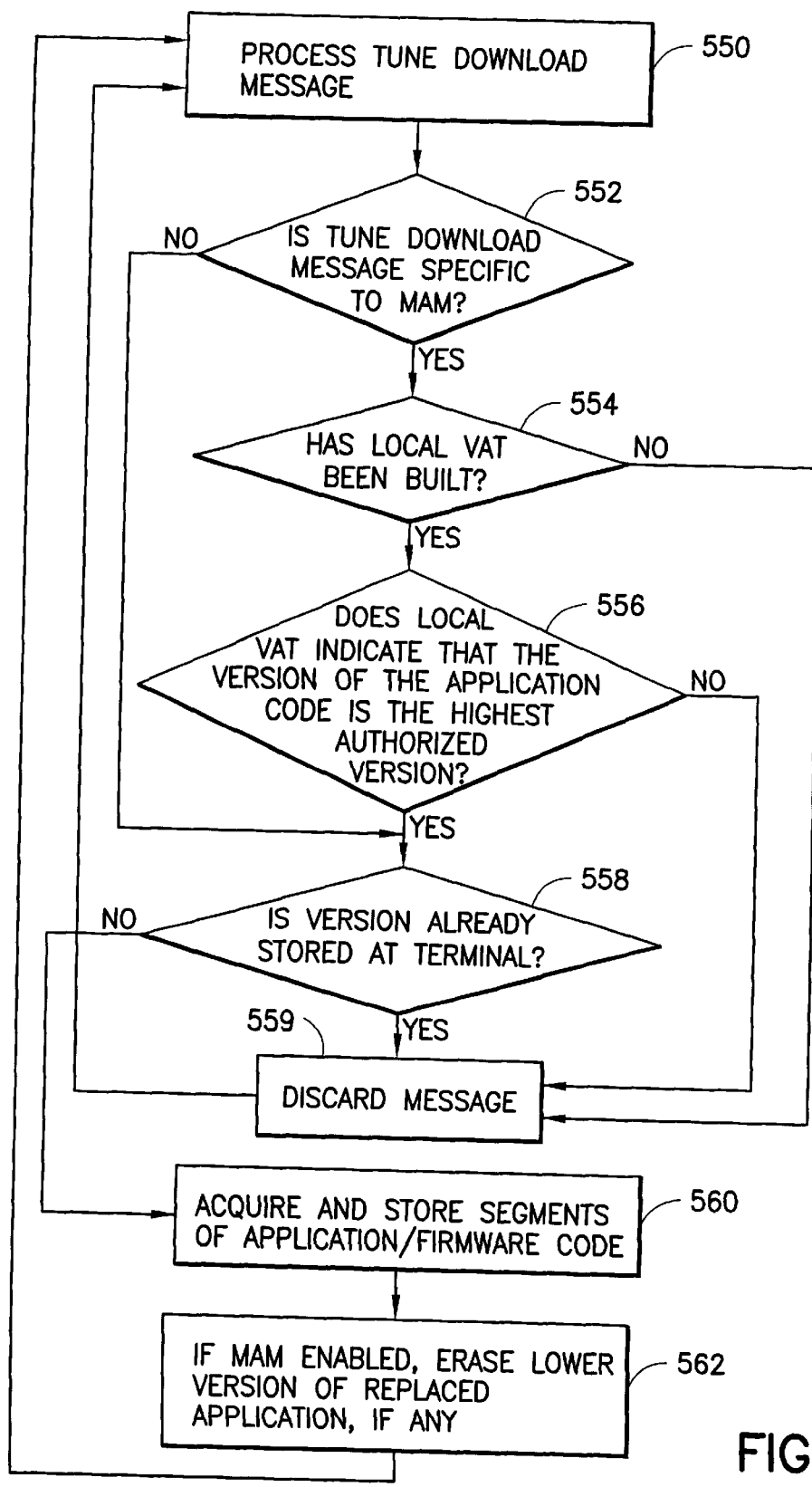
FIG. 5(c) illustrates a method for processing a tune download message in accordance with the present invention.

FIG. 5(*a*) illustrates a method for processing configuration and application data in accordance with the present invention. Configuration data with a configure signal are received at the terminal (block 500). MAM processes and stores the configuration data (block 502). The terminal then receives application data (e.g., VAT data) with version identifiers and authorization requirements for each application (block 504). If this data is new (block 506), the MAM processes and stores the VAT data and the authorization requirements (block 510). If the data is not new, processing continues at block 500.

After MAM processes the received data, it queries the security processor to locate applications whose authorization requirements correlate with the terminal authorization rights (block 512). Based on the correlation, the terminal builds and stores its local VAT (e.g., database or record) of authorized applications (block 514).

FIG. 5(*b*) illustrates a method for processing terminal authorization rights in accordance with the present invention. At block 530, control data, including terminal authorization rights (e.g., EMMS), are received at the terminal. If this is new data (block 532), the security processor processes and stores the terminal authorization rights (block 536). Each terminal can have its own authorization state, which may be subsequently replaced or supplemented. If the control data and terminal authorization rights are not new data, the data is discarded (block 534).

FIG. 5(*c*) illustrates a method for processing a tune download message in accordance with the present invention.

Each tune download message that is received by the terminal is processed (block 550). If the tune download message is specific to MAM (block 552), a determination is made as to whether the terminal's local VAT has been built (block 554). If the local VAT has been built, it is queried to see if the version of the application code associated with the tune download message is the highest authorized version (block 556). If it is the highest authorized version, a determination is made as to whether the version of the application code is already stored at the terminal (block 558). If not already stored, the terminal acquires and stores segments of the application code or other firmware (block 560). Moreover, if MAM is enabled, any lower versions of the application that were replaced by the higher version are erased (block 562).

If the tune download message is not specific to MAM, processing continues at block 558. Note that the invention accommodates both MAM and other types of application or firmware that can be downloaded to a terminal.

If the local VAT has not been built when the MAM-specific tune download message was received (block 554), or if the version of the application code associated with the tune download message is not the highest authorized version (block 556), or if the version of the application code associated with the tune download message is the highest authorized version, but is already stored at the terminal (block 558), the message is discarded (block 559).

Note that the processes in FIGS. 5(*a*)–(*c*) may operate in parallel. Moreover, in accordance with the invention, the demands on the security processor are minimized. For example, in the process of FIG. 5(*a*), the security processor is queried only when new application data and authorization requirements are received by the terminal. Moreover, in the process of FIG. 5(*b*), the security processor is queried only when new terminal authorization rights are received. These cases occur relatively infrequently.

In contrast, the tune download message (FIG. 5(*c*)) is typically communicated to the terminal relatively frequently, e.g., every few minutes. The tune download message may be repetitively transmitted in a process known as carouselling. This is necessary so that an application can be downloaded by a terminal in a relatively short time, and so that downloading can begin at any time. Advantageously, there is no need to query the security processor when processing the tune download messages.

1. Discussion

In accordance with the invention, a Virtual Application Config message (see Section 1.1.2 below) informs the MAM about which VAT is the default or home VAT for the terminal. The receipt of the Virtual Application Config Message also places the terminal in a configured_for_MAM state. A terminal that has received and processed its home VAT is considered to be in a MAM enabled state.

The VAT includes one or more VAT records, each of which contains various fields related to the virtual application.

The VAT record for an application provides the virtual application's ID (the object application_ID field), and specifies version numbers (the object_version field) of the application, which may co-exist in the digital network. For each version of the application, which is listed in the VAT record, a corresponding authorization tier (the virtual_application_tier field) is provided in the record. The authorization tiers in the VAT records specify the authorization requirements for the virtual application. The MAM provides the authorization requirements to the Security Processor module in the terminal. The terminal also receives authorization rights for virtual applications (and their versions) by means of EMMs.

Using the authorization requirements and the authorization rights, the security processor informs the MAM about the authorization state of each specific version of each virtual application. The MAM preserves this authorization state information in its own internal tables in the non-volatile memory 234. After the VAT has been processed and the authorization states of virtual applications have been determined by the MAM, the terminal is in a MAM_enabled state.

The MAM maintains the information from the Virtual Application Config and the VOMs, as well as the internal tables and authorization state information of virtual applications, in non-volatile memory. The information is thus preserved through any warm resets of the terminal.

TDCMs can now be received and processed by the terminal. As part of this invention, in a MAM environment, the TDCMs are not required to have a tier match decoder condition in the MPEG message preamble in order to authorize downloads.

The MPEG Message Preamble Handler does not check with the security processor for processing the TDCMs. These messages are ultimately passed to the Downloader module in the terminal. The Downloader checks if the version of the code object specified in the message is or is not already present in the object download directory maintained by the Downloader.

If the version is not already present, the Downloader inquires of the MAM module about whether there is authorization to tune to and acquire a virtual application specified in the TDCM. As already described above, the MAM maintains the authorization state information about various virtual applications in its internal tables in non-volatile memory. Hence, MAM provides information about the authorization state of a particular virtual application to the Downloader directly from MAM's internal tables. Again, the Security Processor is not invoked. This unique operation of the inventive system avoids the expensive security chip processing every time a TDCM is received by the terminal. More of the Security Processor's resources are therefore available for other decryption processing, such as video decryption.

If the definition or authorization requirements of a virtual application change or are modified, the Controller transmits VOMs containing new VATs with a different VAT identifier (ID), or the same VAT with a different Sequence Number. When terminals receive this new or modified VAT, the MAM module updates its internal tables with information about each of the virtual applications. The MAM obtains the new authorization states for each of the virtual applications from the Security Processor by using the latest authorization requirements and the latest authorization rights (obtained via EMMs).

Similarly, the MAM obtains new authorization state information from the Security Processor for all the virtual applications in the current VAT if the terminal receives new authorization rights via EMMs. In order to provide backward compatibility for terminals in the network which are not executing MAM capable firmware (platform code), the TDCMs have a newly invented configured_for_MAM state match decoder condition. The state match decoder condition does not require a Security chip processing. The MPEG Packet Processor simply checks the state of the terminal to determine if the message should be processed.

Terminals not operating MAM capable firmware (platform code) are ignorant of the newly invented configured_for_MAM decoder condition. The terminals not configured for MAM will therefore not process the TDCMs for virtual applications.

However, as was noted before, an Electronic Program Guide (EPG) has traditionally been the one and only application, which even older non-MAM capable terminals acquired and enabled. Hence, the inventive system allows for one application in a MAM environment to be regarded as a system wide default virtual application. The TDCM for the system wide default application is the only TDCM that relates to an application in the digital network which does not contain a configured_for_MAM decoder condition.

The traditional EPG can be designated as the system wide default application, in which case the TDCM for the EPG application does not have the configured_for_MAM decoder condition, and is be processed by all terminals in the network.

ously reserved value, and represents the Virtual Application Config message. A Virtual Application Config message is used to configure or de-configure a terminal for MAM and to provide MAM configuration settings to the terminal.

Information derived from the Virtual Application Config message is kept by the terminal in non-volatile memory, in order to preserve it through (warm) resets of the terminal.

The significant fields in the Virtual Application Config message are described in Table 1 below.

TABLE 1

Significant Fields in a Virtual Application Config Message

| Name of Field | Description |
| --- | --- |
| config_for_multi_apps | This field, if set to "yes" configures a terminal for MAM. The terminal is then considered to be in a configured_for_MAM state.<br>The terminal will then be able to receive other messages which have the configured_for_MAM decoder condition in the DCII message preamble.<br>If this field is cleared to "no", the terminal will no longer be configured_for_MAM, nor enabled for MAM. |
| home_VAT_ID | This field identifies a VAT which must be used by the terminal as the terminal's default VAT (home_VAT).<br>(The VAT is described in 1.1.3). |
| default_application_ID | This field identifies an application which will be the default virtual application for the terminal.<br>(This ID correlates to the object_application_ID of a virtual application in the home_VAT). |
| volatile_memory_config | This specifies the number of bytes of volatile memory that the terminal allocates and make available for the download of virtual applications other than the default virtual application. |

1.1. Detailed Description of the Messages and Data Structures

1.1.1. The Newly Created DCII Message Preamble Decoder Conditional

A new enumeration "configured_for_MAM" has been defined and added as part of the DigiCipher® II (DCII) message preamble decoder condition functionality, using a previously reserved entry. However, this conditional is suitable for use with data communication schemes, such as MPEG. DCII is a digital television standard proprietary to Motorola Corporation. This decoder condition is prefixed to certain messages, such as the VOM and the TDCM, sent by the controller to the terminals. (These messages are described later in Sections 1.1.3 and 1.1.4, respectively). Consequently, a terminal which has not been configured_for_MAM will not acquire a VAT and become MAM-enabled, nor tune to a download channel for acquiring a virtual application.

The selective use of this decoder conditional also allows older terminals that are not upgraded with MAM capable firmware platform code, to continue to operate without any detrimental side effects caused by the innovations involved with MAM.

1.1.2. The Newly Created Virtual Application Config Message

A new sub-command has been added to the Digital Cable Terminal (DCT) Configuration message, by using a previ-

1.1.3. The Newly Created Virtual Object Message

A new DCII message type has been created by using a previously reserved value, and represents the Virtual Object message.

A Virtual Object message is used to deliver a VAT to a terminal. This message is carried in the network stream and may be sent either broadcast-addressed, multicast-addressed or singlecast-addressed to the terminal, using segmentation overlay. The controller (e.g., the DAC) prefixes the virtual object message with a configured_for_MAM decoder condition in the message preamble.

Therefore, only terminals, which are configured_for_MAM, will process this message.

This ensures that terminals, which are not running a MAM capable firmware (platform code), will fail the decoder condition test, and will not acquire a Virtual Application Table.

A terminal is considered to be in a MAM enabled state if it is configured_for_MAM and has completely acquired its home_VAT. (described in Section 1.1.2 above). Information derived from the Virtual Object message, including the VAT, is kept by the terminal in non-volatile memory, in order to preserve it through (warm) resets of the terminal.

The significant fields in the Virtual Object message are described in Table 2.

TABLE 2

Significant Fields in a Virtual Object Message

| Name of Field | Description |
| --- | --- |
| table_subtype | This field can be used to specify that this VOM contains a VAT. |
| VAT_ID | This field specifies an identifier for the VAT contained in this message.<br>The ID maybe the same as the home_VAT_ID from the Virtual Application Config message described in Section 1.1.2. |
| sequence_number | This field serves as a version number for the VAT.<br>If the sequence_number for the VAT included in this message is different from the sequence_number associated with the VAT with the same VAT_ID already present in the terminal, then it implies that the VAT has changed. |
| number_of_va_records | This field specifies how many VAT records are present in the VAT included in this message. |
| va_record | This is an array of VAT records constituting the VAT.<br>Each record identifies a virtual application. One of the records may identify the virtual application whose default_application_ID was given in the Virtual Application Config message (described in Section 1.1.2). |

Table 3 describes the significant fields in each record of a Virtual Application Table (VAT).

TABLE 3

Significant Fields in a "va_record" in a Virtual Object message

| Name of Field | Description |
| --- | --- |
| object_application_ID | This field contains a numeric identifier for the virtual application.<br>The identifier must be unique between all va_records within a VAT. |
| VCT_source_ID | This is a list of identifiers of programming "sources" which are associated with the virtual application.<br>The terminal may use these values to obtain a virtual channel to be tuned to before enabling the virtual application. |
| VCT_application_ID | This is a list of identifiers of "services" associated with the virtual application.<br>The values and usage are the same as described for VCT_source_ID above. |
| object_version | This is a list of version numbers for each of the versions, which can exist, of a virtual application.<br>The terminal will enable the highest version, which can be authorized. |
| virtual_application_tier | This is a list of authorization tiers for the virtual application, one per version. (All versions of an application may have the same or different tiers).<br>This specifies the authorization requirements for the versions of the virtual application. |
| virtual_name | This is a multi-lingual text string of printable ASCII characters.<br>The name can be used for on-screen displays at the terminal. |

1.1.4. The Modified Definition of the Tune Download Channel Message

This message, which is a sub-command of the DCT Download Control message, has been modified. The definition of the tune_download_function_field has been enhanced. A previously-reserved value has been re-defined to specify whether the message applies to a virtual_application" or to a fixed or standard application.

The Tune Download Channel message for all virtual applications (except for a system wide default application) must contain the configured_for_MAM decoder condition in the message preamble. Therefore, only terminals which are configured_for_MAM, will process this message. This ensures that terminals, which are not running a MAM capable firmware platform code will fail the decoder condition test, and will not acquire a virtual application.

If a virtual application is specified in the Tune Download Channel message, the virtual application is identified by the obj_application_ID field in the message. This virtual application then correlates to the one identified by the object application_ID_field in one of the records of the Virtual Application Table (the home_VAT) maintained by the Multiple Application Manager. Moreover, the obj_application_ID, tune_object_name and tune_object_version in the Tune Download Channel message should correlate with the application_ID, object_name and object_version in the DCT Download message for the virtual application.

The Tune Download Channel message for the system wide default virtual application is an exception. The configured_for_MAM decoder condition is not used for this default application. Consequently, all terminals will always be able to acquire the system wide default application.

1.1.5. The Modified Functionality of the Download Control Message

This message, which is also a sub-command of the DCT Download Control message, has modified functionality as an implication of the invention. Since the MAM has the information (via the VAT) about which applications must be enabled, disabled, purged, etc., the Downloader can no longer directly act on the receipt of the Download Control sub-command message. Therefore, if MAM is enabled on a terminal, the "disable", "delete" and "purge" functions specified in a DCT Download Control sub-command message, for virtual applications, are ignored by the Downloader module in the terminal.

In addition, if MAM is enabled, the "enable" function specified in a DCT Download Control sub-command message for a virtual application causes the Downloader to interrogate the Multiple Application Manager module to see if the application should indeed be enabled. The MAM responds back with information whether to enable or disable the virtual application.

1.1.6. The Modified Functionality of the Virtual Channel Config Message

This message, which is a sub-command of the DCT Config message, has modified functionality as an implication of the invention. If MAM is enabled, the terminal will disregard the turnon_VC_defined, turnon_VC, turnoff_VC_defined and turnoff_VC fields specified by this message if the default virtual application has a defined VCT_source_ID. In this case, the terminal will tune to the channel associated with the VCT_source_ID given for the default virtual application.

Conclusion

It should now be appreciated that the present invention provides a system architecture for managing the security aspects of multiple applications in large scale networks. In particular, the processing load of a security processor is reduced by configuring a MAM to determine if frequently-transmitted application data should be downloaded. The security processor configures an authorization state of the terminal. In response, the MAM build a local virtual application table that indicates which applications are authorized for downloading, i.e., the applications whose required authorization state correlate with the terminal's configured authorization state.

Although the invention has been described in connection with various preferred embodiments, it should be appreciated that various modifications and adaptations may be made thereto without departing from the scope of the invention as set forth in the claims.

For example, the principles of the invention can be extended to authentication, authorization and billing of operating systems, scripting language content (e.g., web pages) and the like.

What is claimed is:

1. A method for processing data in a digital user terminal, comprising the steps of:

providing data to the terminal that includes at least terminal authorization rights, configuration data, and download messages;

the download messages comprising application data for applications that are executable on the terminal;

said applications having associated required authorization requirements;

processing the terminal authorization rights at a security processor at the terminal to configure an authorization state of the terminal;

processing the configuration data at a multiple applications manager at the terminal to configure the terminal to receive the application data;

the multiple applications manager querying the security processor to establish a database of the applications whose required authorization states correlate with the terminal's authorization state; and processing the download messages to determine whether to download or discard the application data received at the terminal in accordance with the database.

2. The method of claim 1, wherein:

the download messages are processed at a downloader associated with the multiple applications manager without querying the security processor.

3. The method of claim 1, wherein:

the security processor processes new terminal authorization rights that are received at the terminal to update the authorization state of the terminal.

4. The method of claim 3, wherein:

the multiple applications manager queries the security processor to establish an updated database of the applications whose required authorization states correlate with the terminal's updated authorization state.

5. The method of claim 1, wherein:

the multiple applications manager queries the security processor to establish an updated database of the applications whose required authorization states correlate with an updated authorization state of the terminal.

6. The method of claim 1, wherein:

the download messages are repetitively transmitted to the terminal.

7. The method of claim 1, wherein:

the security processor is free to perform other tasks while the download messages are processed.

8. The method of claim 1, wherein:

the user terminal is in a broadband communication network.

9. A digital user terminal for processing data, comprising:

means for providing data to the terminal that includes at least terminal authorization rights, configuration data, and download messages;

the download messages comprising application data for applications that are executable on the terminal;

said applications having associated required authorization requirements;

a security processor for processing the terminal authorization rights to configure an authorization state of the terminal;

a multiple applications manager for processing the configuration data to configure the terminal to receive the application data; wherein:

the multiple applications manager queries the security processor to establish a database of the applications whose required authorization states correlate with the terminal's authorization state; and a downloader associated with the multiple applications manager for processing the download messages to determine whether to download or discard the application data received at the terminal in accordance with the database.

10. The terminal of claim 9, wherein:

the downloader processes the download messages without querying the security processor.

11. The terminal of claim 9, wherein:

the security processor processes new terminal authorization rights that are received at the terminal to update the authorization state of the terminal.

12. The terminal of claim 11, wherein:

the multiple applications manager queries the security processor to establish an updated database of the applications whose required authorization states correlate with the terminal's updated authorization state.

13. The terminal of claim 9, wherein:

the multiple applications manager queries the security processor to establish an updated database of the applications whose required authorization states correlate with an updated authorization state of the terminal.

14. The terminal of claim 9, wherein:

the download messages are repetitively transmitted to the terminal.

15. The terminal of claim 9, wherein:

the security processor is free to perform other tasks while the download messages are processed.

16. The terminal of claim 9, wherein:

the terminal is in a broadband communication network.

* * * * *